United States Patent
Sun et al.

(10) Patent No.: US 11,616,576 B2
(45) Date of Patent: Mar. 28, 2023

(54) ONBOARD/CO-PACKAGED OPTICS WITH TRANSMIT-SIDE EQUALIZATION

(71) Applicant: CREDO TECHNOLOGY GROUP LTD, Grand Cayman (KY)

(72) Inventors: Junqing Sun, Fremont, CA (US); Haoli Qian, Fremont, CA (US)

(73) Assignee: CREDO TECHNOLOGY GROUP LTD, Grand Cayman (KY)

( * ) Notice: Subject to any disclaimer, the term of this patent is extended or adjusted under 35 U.S.C. 154(b) by 0 days.

(21) Appl. No.: 17/305,434

(22) Filed: Jul. 7, 2021

(65) Prior Publication Data
US 2023/0010441 A1    Jan. 12, 2023

(51) Int. Cl.
*H04B 10/40* (2013.01)
*H04B 10/60* (2013.01)
*H04B 10/50* (2013.01)
*H04L 25/03* (2006.01)

(52) U.S. Cl.
CPC ........... *H04B 10/40* (2013.01); *H04B 10/501* (2013.01); *H04B 10/60* (2013.01); *H04L 25/03878* (2013.01)

(58) Field of Classification Search
CPC ...... H04B 10/40; H04B 10/501; H04B 10/60; H04L 25/03878
USPC ........................................................ 398/139
See application file for complete search history.

(56) References Cited

U.S. PATENT DOCUMENTS

| | | | |
|---|---|---|---|
| 8,639,112 B2 | 1/2014 | Lindsay | |
| 9,337,993 B1 * | 5/2016 | Lugthart | .............. H04L 7/0037 |
| 11,032,111 B2 | 6/2021 | Sun et al. | |
| 11,171,815 B2 | 11/2021 | Sun | |
| 2010/0158530 A1 * | 6/2010 | Soto | ........................ H04J 14/02 398/79 |

(Continued)

OTHER PUBLICATIONS

IEEE Standard for Ethernet, IEEE Std 802.3-2015. (Revision of IEEE Std 802.3-2012) accessed Sep. 8, 2022: https://standards.ieee.org/ieee/802.3/6003/.

(Continued)

*Primary Examiner* — Dalzid E Singh
(74) *Attorney, Agent, or Firm* — Ramey LLP; Daniel J. Krueger (57) ABSTRACT

Transmit-side equalization is disclosed for network devices and network communications methods employing onboard/co-packaged optics. An illustrative network device includes a substrate having a host device IC (integrated circuit) and an optical module IC connected by a short-reach link. The optical module IC having a transmit chain includes a CTLE (continuous time linear equalizer) to at least partly compensate for a channel response of the short-reach link, and a driver that amplifies an output of the CTLE for a photoemitter that couples to an optical fiber. The host device IC includes: a parallel-to-serial converter that produces a digital symbol stream; a digital to analog converter that supplies an analog signal to the short-reach link; and a pre-equalizer coupling the parallel-to-serial converter to the digital-to-analog converter, the pre-equalizer filtering the digital symbol stream to at least partly compensate for a channel response of a combined channel that includes the short-reach link, the CTLE, the driver, and the photoemitter.

24 Claims, 5 Drawing Sheets

(56) References Cited

U.S. PATENT DOCUMENTS

| | | | | |
|---|---|---|---|---|
| 2015/0249501 A1* | 9/2015 | Nagarajan | .............. | H04B 10/40 |
| | | | | 398/79 |
| 2018/0013495 A1* | 1/2018 | Ling | ...................... | H04B 10/40 |
| 2021/0218472 A1* | 7/2021 | Latchman | .......... | H04B 10/2543 |
| 2022/0123841 A1* | 4/2022 | Frankel | ................ | H04B 10/541 |

OTHER PUBLICATIONS

Li, Mike Peng, et al. "CEI-112G-XSR-PAM4 Extra Short Reach Interface" Implementation Agreement OIF-CEI-05.0. Contribution No. OIF2019.065.07, Working Group—Physical Link Layer (PLL), Clause 26, pp. 1-22. Common Electrical I/O (CEI); The Optical Internetworking Forum; Fremont, CA; Jan. 3, 2021.

* cited by examiner

ONBOARD/CO-PACKAGED OPTICS WITH TRANSMIT-SIDE EQUALIZATION

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This standard provides a common media access control specification for local area network (LAN) operations at selected speeds from 1 Mb/s to 100 Gb/s over coaxial cable, twisted wire pair cable, fiber optic cable, and electrical backplanes, with various channel signal constellations. As demand continues for ever-higher data rates, extensions to the standard must account for increased channel attenuation and dispersion even as the equalizers are forced to operate at faster symbol rates.

At symbol rates approaching or exceeding 100 Gsym/s (gigasymbols per second), even the printed circuit board traces connecting the optical signaling modules to the packaged integrated circuits can become a significant source of signal loss. For network devices, one proposed approach to this issue is to minimize or eliminate the printed circuit board traces by positioning the optical signaling modules very near ("onboard"), or even on the same package substrate as ("co-packaged"), the integrated circuit device that provides the network communications functionality. In this vein, the Optical Internetworking Forum has proposed a Common Electrical I/O standard "OIF-CEI-05.0 Clause 26: CEI-112G-XSR-PAM4 Extra Short Reach Interface", which is hereby incorporated herein by reference. The proposed standard limits the trace length to 50 mm (less than 2 inches).

The use of onboard/co-packaged optics is intended to reduce the power consumption associated with high symbol rate I/O data streams, but further reductions remain desirable to offset the increased component density.

SUMMARY

Accordingly, there are disclosed herein network devices and network communications methods employing onboard/co-packaged optics with transmit-side equalization, which by reducing power requirements for equalization may improve performance and efficiency. An illustrative network device includes a substrate having a host device IC (integrated circuit) and an optical module IC connected by a short-reach link. The optical module IC having a transmit chain includes a CTLE (continuous time linear equalizer) to at least partly compensate for a channel response of the short-reach link, and a driver that amplifies an output of the CTLE for a photoemitter that couples to an optical fiber. The host device IC includes: a parallel-to-serial converter that produces a digital symbol stream; a digital to analog converter that supplies an analog signal to the short-reach link; and a pre-equalizer coupling the parallel-to-serial converter to the digital-to-analog converter, the pre-equalizer filtering the digital symbol stream to at least partly compensate for a channel response of a combined channel that includes the short-reach link, the CTLE, the driver, and the photoemitter. An associated method includes filtering a digital symbol stream with a pre-equalizer to at least partly compensate for a channel response of a combined channel that includes the short-reach link, the CTLE, the driver, and the photoemitter.

Another illustrative network device includes a substrate having a host device IC (integrated circuit) and an optical module IC connected by a short-reach link. The optical module IC having a transmit chain includes: a clock and data recovery circuit to obtain a digital symbol stream via the short-reach link; a pre-equalizer that filters the digital symbol stream to at least partly compensate for a channel response of a combined channel; and a driver that amplifies a filtered signal for a photoemitter that couples to an optical fiber. The combined channel includes the driver, the photoemitter, the optical fiber, and a remote photodetector. An associated method includes filtering the digital symbol stream with a pre-equalizer to at least partly compensate for a channel response of a combined channel, where the combined channel includes at least a driver, a photoemitter, an optical fiber, and a remote photodetector.

Each of the foregoing embodiments may be implemented individually or in combination, and may be implemented with any one or more of the following features in any suitable combination: 1. the combined channel further includes the optical fiber and a remote photodetector. 2. the combined channel further includes the optical fiber, a remote optical module IC, and a remote short-reach link that connects the remote optical module IC to a remote host device IC. 3. the pre-equalizer is a finite impulse response filter with one or more floating taps. 4. the optical module IC also has a receive chain including: a photodetector to convert an optical receive signal into an electrical receive signal; and a gain control amplifier that conveys the electrical receive signal via the short-reach link to the host device IC. 5. the host device IC further includes: an analog-to-digital converter that converts the electrical receive signal into a digital receive signal; an equalizer that operates on the digital receive signal to produce an equalized signal; and a data recovery element that converts the equalized signal into a received digital data stream. 6. the host device IC further includes a training controller that modifies coefficients of the pre-equalizer and the equalizer to better compensate for the channel response of the combined channel. 7. the training controller provides a stream of training frames having header information including coefficient updates for a remote pre-equalizer. 8. the optical module IC also has a receive chain including: a local photodetector to convert an optical receive signal into an electrical receive signal; an analog to digital converter coupled to the local photodetector to derive a digital receive signal; an equalizer that operates on the digital receive signal to produce an equalized signal; and a data recovery element that converts the equalized signal into a received digital data stream. 9. a training controller that modifies coefficients of the pre-equalizer and the equalizer to better compensate for the channel response of the combined channel. 10. the training controller provides a stream of training frames having header information including coefficient updates for a remote pre-equalizer.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Figure 1:
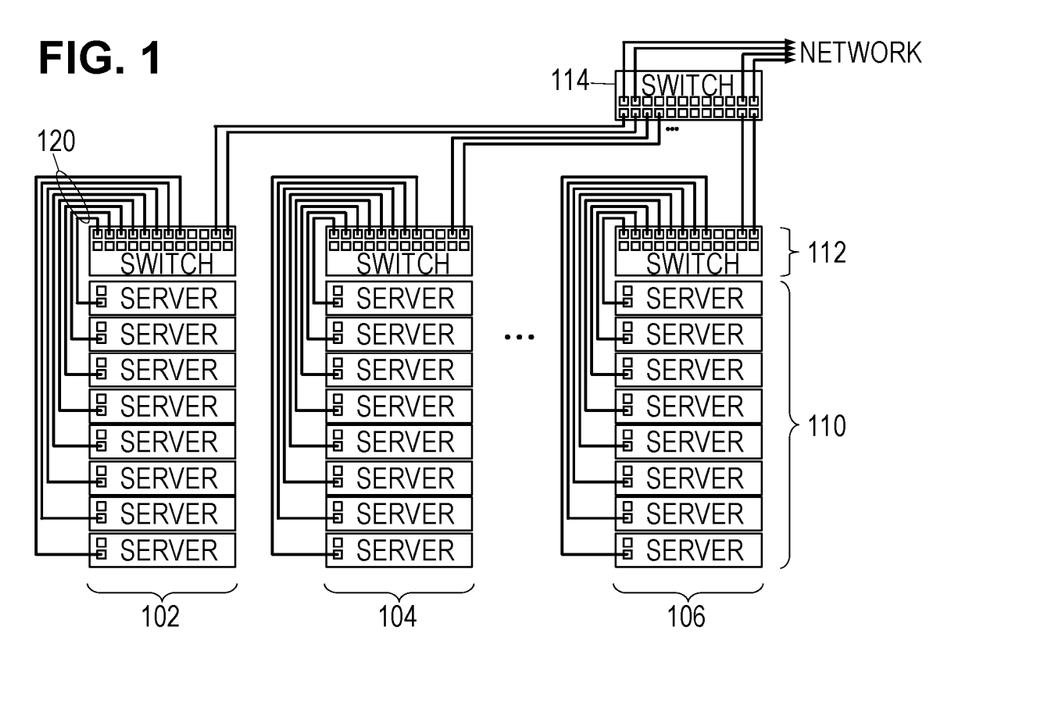
FIG. 1 shows an illustrative communications network.

For context, FIG. 1 shows an illustrative communications network such as might be found in a data processing center, with multiple server racks 102-106 each containing multiple servers 110 and one or more switches 112. The switches 112 may be termed "top of rack" (TOR) switches, each of which are connected to one or more aggregator switches 114 with fiberoptic cables 120 for interconnectivity and connection to the regional network and internet.

Switches and servers are just two examples of network devices that may employ onboard or co-packaged optics for high rate communication links via fiberoptic cables 120. Other examples include routers, hubs, network bridges, and network-attached storage devices.

Figure 2:
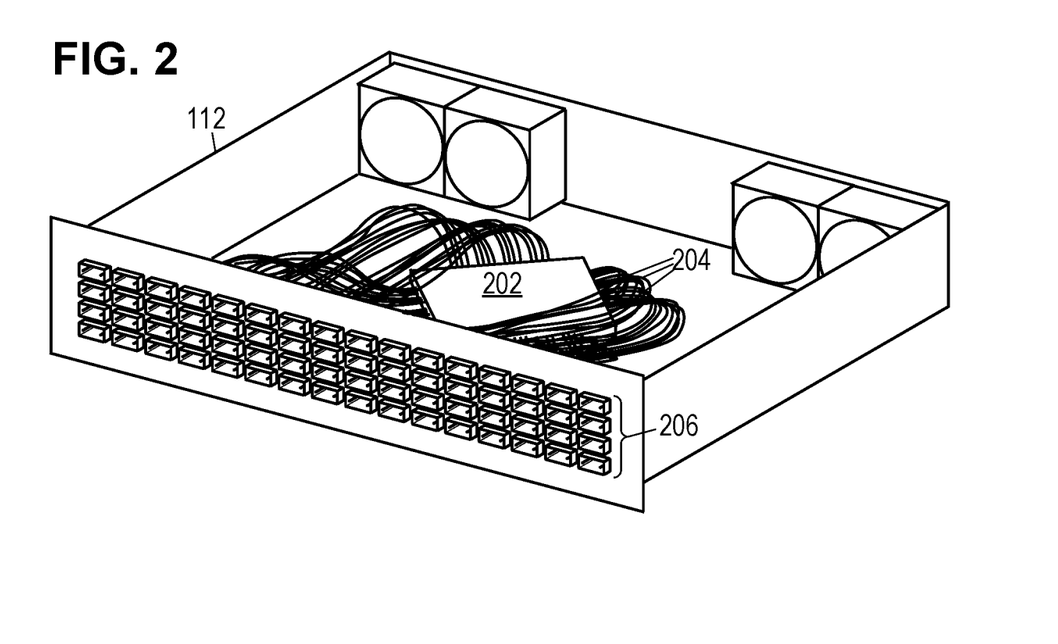
FIG. 2 is a perspective view of an illustrative switch with co-packaged optics.

FIG. 2 shows an illustrative TOR switch 112 having co-packaged optics. Switch 112 includes an application-specific integrated circuit (ASIC) as its host device IC, providing packet-switched connections between its various input/output (I/O) ports. In the co-packaged configuration, a multi-chip module (MCM) package 202 includes the host device on a package substrate that also carries multiple optical module ICs. Optical fibers 204 couple each of the front panel couplers 206 to a corresponding one of the optical module ICs. Illustrative front panel couplers include Multi-fiber Push On (MPO) and Multi-fiber Termination Push-on (MTP) connectors. In an alternative onboard configuration, a printed circuit board would have the optical module ICs mounted near (e.g., within 50 mm) the host device IC. In either configuration, the distance between the host device IC ports and the optical fibers is minimal to reduce attenuation of the high-frequency communications signal components.

Figure 3:
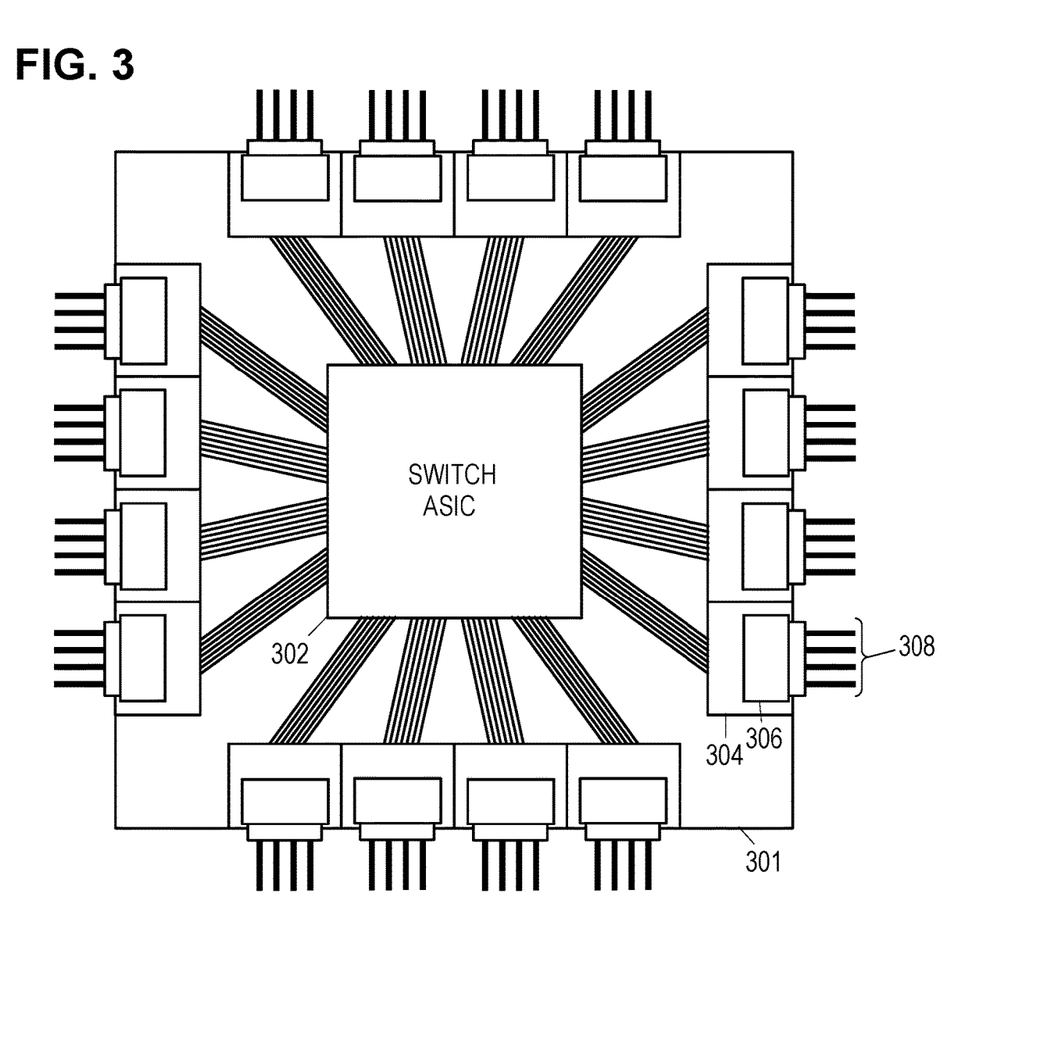
FIG. 3 is a schematic diagram of an illustrative package substrate with host device IC and optical module ICs.
Figure 4:
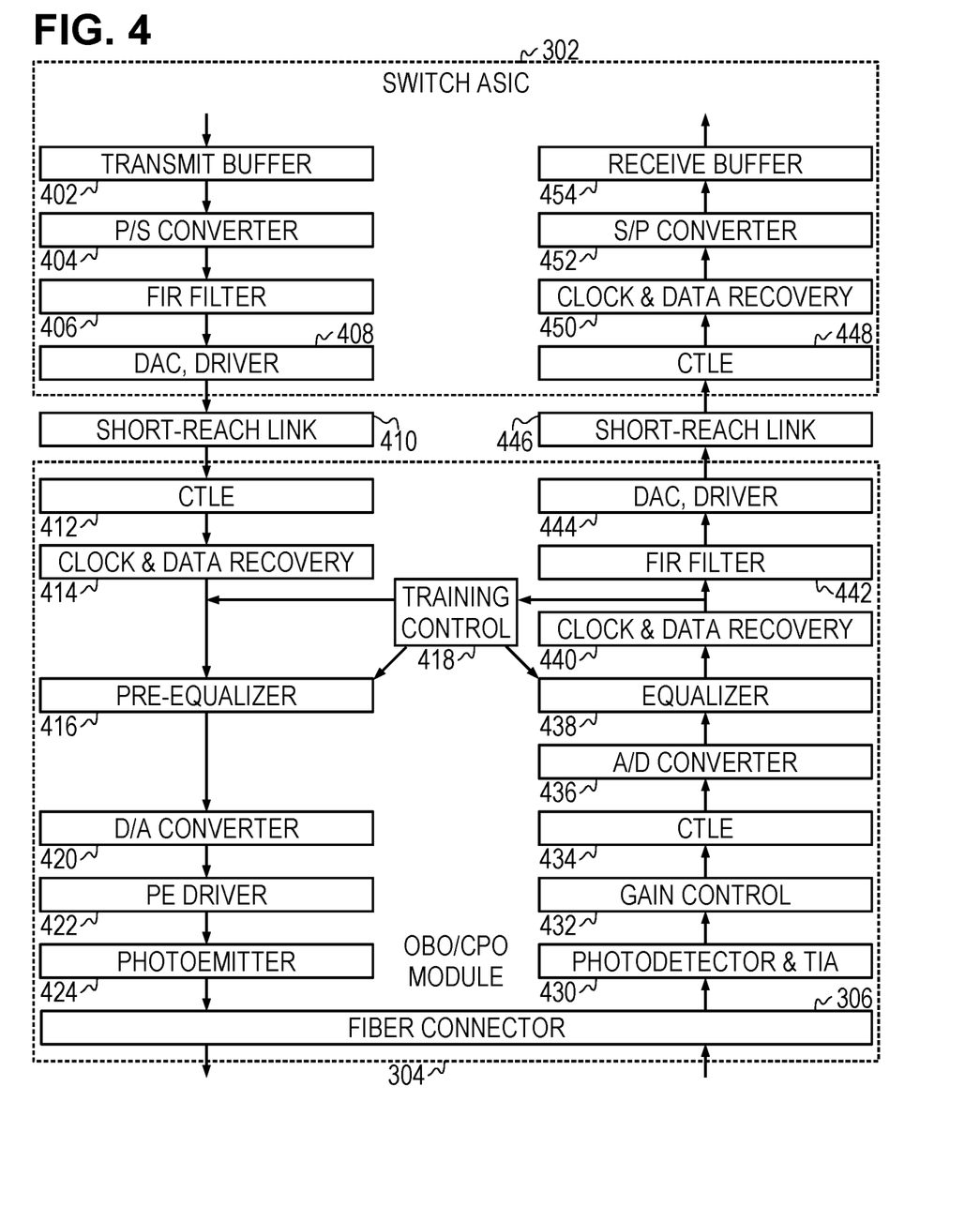
FIG. 4 is a block diagram of an optical module IC coupled to a host device IC in a first configuration.
Figure 5:
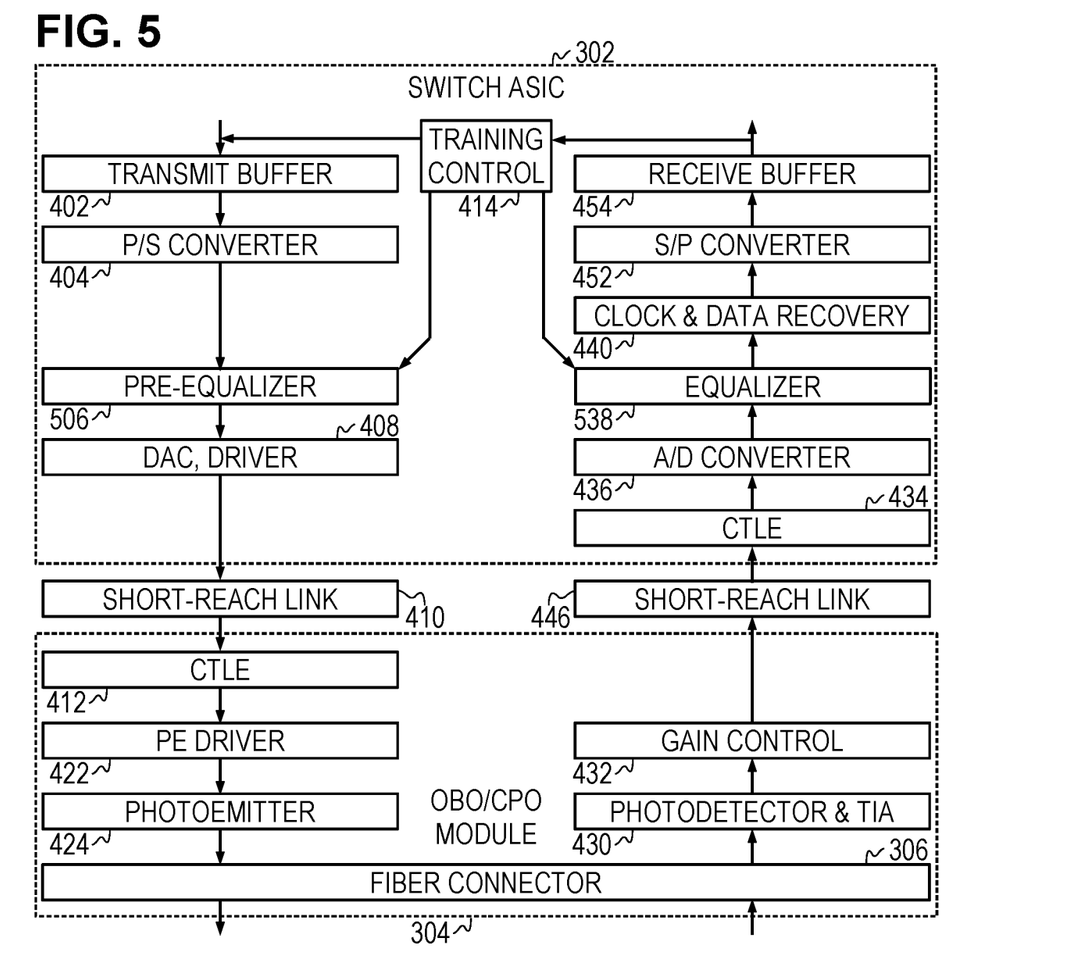
FIG. 5 is a block diagram of an optical module IC coupled to a host device IC in an alternative configuration.

FIG. 3 shows an illustrative MCM package substrate 301 having a switch ASIC 302 in the center and an array of optical module ICs 304 around the periphery. Each optical module IC 304 includes a connector 306 for coupling optical fibers 308 to integrated photoemitters and photodetectors. The illustrated switch ASIC 302 provides packet-switched connections among its 64 electrical I/O ports. Each I/O port may support multi-lane input data streams and multi-lane output data streams, each lane conveying up to 58 Gsym/s or more of 4-level pulse amplitude modulated (PAM4) symbols. As shown in FIGS. 4-5, a photoemitter is coupled to each output lane and a photodetector is coupled to each input lane.

FIG. 4 shows a first configuration for one input (receive) data stream lane and one output (transmit) data stream lane. Though the components are shown and described here using function blocks, it should be understood that the blocks represent integrated circuit modules that are commercially available in component libraries of various application specific integrated circuit design software packages and/or as firmware executable by programmable controllers or processing units.

Each I/O port of the switch ASIC 302 may couple to one or more lanes as needed to support the desired data rates. For each lane, the switch ASIC provides a transmit buffer 402 to buffer the digital transmit data, which is typically received in blocks of bits or multi-bit symbols. A parallel-to-serial converter 404 accesses the buffer to produce, in this example, a serialized stream of PAM4 symbols. Other example implementations may produce a stream of bits or other symbols. The symbol stream is preferably compliant with a standard protocol such as that for PCS data streams as set forth in the Ethernet standard (IEEE Std. 802.3-2015), including frames with alignment markers.

An optional finite impulse response (FIR) filter 406 may be used to provide pre-emphasis of high frequency components to combat attenuation of the short reach link 410. A digital-to-analog converter (DAC) converts the filtered signal to analog form and a driver 408 supplies sufficient current to convey the transmit signal across the short-reach link 410 to the optical module IC 304. The short-reach link 410 consists of conductive traces on the package substrate (co-packaged optics) or on the printed circuit board substrate (onboard optics). Though the traces may be limited to, say, less than 50 mm, they may nevertheless be expected to cause significant frequency-dependent attenuation and dispersion at the upper range of signal frequencies contemplated here.

In the optical module IC 304, a continuous time linear equalizer (CTLE) filter 412 cooperates with the optional FIR filter 406 to compensate for the effects of the short-reach link 410. A clock and data recovery (CDR) module 414 operates on the filtered signal to derive a clock signal for sampling and re-digitizing the digital symbol stream. A pre-equalizer 416 operates on the digital symbol stream to at least partly compensate for the combined channel effects of the photoemitter, the driver for the photoemitter, the optical fiber, and the components of the remote receiver. A DAC 420 converts the pre-equalized signal to an analog signal, which the driver 422 for the photoemitter amplifies to drive the photoemitter 424. The fiber connector 306 couples the optical signal from the photoemitter to an optical fiber for conveyance to a remote photodetector and receiver.

We note here that pre-equalization generally increases signal energy in those frequency ranges where the channel signal attenuation is highest, thereby increasing the amount of signal energy dissipation within the channel, in addition to necessitating power consumption by the pre-equalizer 416 itself. For the contemplated channels, however, this increased power consumption is small in comparison to the achievable power savings that results from associated reductions in receiver complexity, particularly the power savings that can be achieved with the equalizer design.

In the optical module IC 304, the fiber connector 304 further couples optical fibers to associated photodetectors 430, which convert the optical receive signals into electrical form, typically a receive signal current that can be converted to a receive signal voltage by a transimpedance amplifier (TIA). A gain control amplifier 432 applies an adjustable gain to optimize the receive signal range for processing by the subsequent components of the receive chain. A CTLE filter 434 provides anti-aliasing and optional spectral shaping prior to signal digitization by analog-to-digital converter 436. A digital equalizer 438 provides adaptive equalization, cooperating with the remote pre-equalizer to compensate for channel effects. A CDR module 440 derives a sampling clock signal and recovers a receive symbol stream from the equalized signal.

Optical module IC 304 further includes an optional FIR filter 442 to provide pre-emphasis of high frequency components to combat attenuation of the short reach link 446. A digital-to-analog converter (DAC) converts the filtered signal to analog form and a driver 444 supplies sufficient current to convey the transmit signal across the short-reach link 446 to the host device IC 302, where CTLE filter 448 combines with the optional FIR filter 442 to compensate for the effects of the short-reach link 446. A clock and data recovery (CDR) module 450 operates on the filtered signal to derive a sample clock signal for recovering the receive symbol stream. A serial-to-parallel converter 452 stores blocks of the receive symbol stream in a receive buffer 454, enabling the use of lower clock rates by the core circuitry of the host device IC.

Optical module IC 304 further includes a training control module 418 to adapt coefficients of the pre-equalizer module 416 and/or equalizer 438. The training control module 418 may generate a sequence of training frames that take the place of the transmit data stream for the duration of a link training phase, and may detect equalization errors associated with training frame symbols in the receive data stream. Combining the equalization errors with the training frame symbols, the training controller 418 can adapt the coefficients of a remote pre-equalizer and/or local equalizer 438 to optimize their combined compensation for the combined receive channel effects. Training controller 418 can communicate the remote pre-equalizer coefficient updates via various backchannel options including, e.g., dedicated fields in the training frames of the transmit symbol stream. Correspondingly, training controller 418 can extract updates for the local pre-equalizer 416 from dedicated fields in the frames of the receive symbol stream. For further details of one illustrative example, see, e.g., co-owned U.S. Pat. No. 10,212,260 "SerDes Architecture with a Hidden Backchannel Protocol", which is hereby incorporated herein by reference.

While the configuration shown in FIG. 4 minimizes complexity of the I/O circuitry on the host device IC 302, we note here that with slightly increased complexity the overall link efficiency can be improved significantly as provided by the illustrative configuration shown in FIG. 5, where significantly fewer components are required in the optical modules 304.

In FIG. 5, the host device IC includes transmit buffer 402 and parallel to serial converter 404, the DAC and a driver 408 for short reach link 410, but omits the FIR filter 406 in favor of a pre-equalizer 506. The transmit chain of the optical module 304 includes only CTLE filter 412, the photoemitter driver 422, and photoemitter 424. As before, a fiber connector 304 couples the photoemitter to a transmit optical fiber and a receive optical fiber to photodetector 430. Similar to the transmit chain, the receive chain of the optical module is minimal, including only the photodetector 430 and a gain control amplifier 432. A short reach link 446 couples the optical module IC 304 to the host device IC 302. Host device IC 302 includes a CTLE filter 434, an analog-to-digital converter 436 to digitize the receive signal, an equalizer 438, a clock and data recovery module 440, a serial-to-parallel converter 452, and receive buffer 454. The training control module 414 is included in the host device IC 302 to adapt the coefficients of the pre-equalizer 506 and equalizer 538.

Pre-equalizer 506 filters the transmit symbol stream to at least partly compensate for the combined channel response that includes the short reach link 410, CTLE 412, driver 422, photoemitter 424, optical fiber channel, the remote photodetector, remote gain control amplifier, and the remote (receiving) short-reach channel. The CTLE 412 and receiving equalizer 538 may aid in compensating for effects of the combined channel, but preferably most of the compensation is performed by the pre-equalizer 506. Because symbols of the transmit data stream can be represented using only one or two bits, the pre-equalizer can be implemented without multipliers, which drastically reduces power requirements relative to a comparable receive-side equalizer.

As the pre-equalizer 416 (FIG. 4) or pre-equalizer 506 (FIG. 5) reduces the performance requirements of equalizer 438, 538, the equalizer can be implemented with less complexity. For example, the number and bit-resolution of coefficients may be reduced. Rather than requiring a decision feedback equalizer with feedback and feed-forward filters, the required equalizer performance may be achieved without feedback (eliminating the feedback filter) or without the feed-forward filter. In some cases, the CTLE filter 434 may provide sufficient receive-side equalization, enabling the equalizer 438, 538 to be eliminated entirely.

Figure 6:
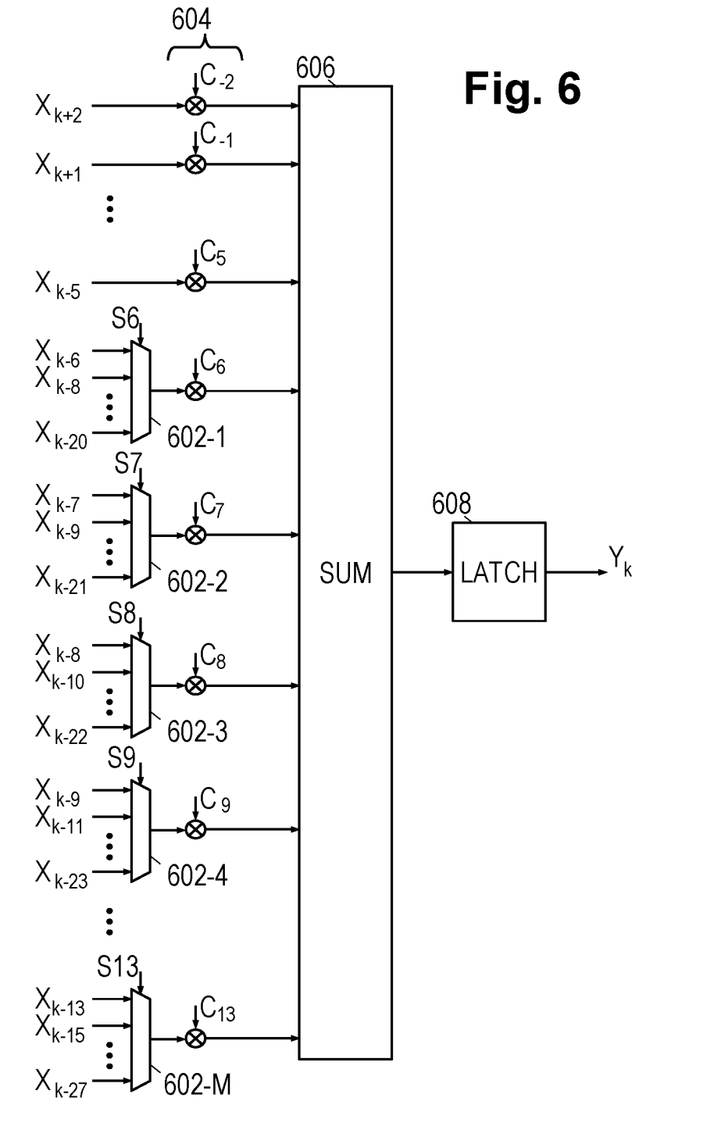
FIG. 6 is a block diagram of an illustrative pre-equalizer.

We note here that the various components of the combined channel may lengthen the combined channel response, especially if there are any significant reflections as could occur, e.g., with the short-reach links. To efficiently combat this lengthening, the pre-equalizer may optionally employ movable taps as shown in FIG. 6. The transmit symbol stream is represented on the left of FIG. 6 as $X_{k-n}$, where the subscript represents a time index with k being the index of the current symbol and n being an offset value. FIG. 6 also shows a set of filter coefficients $C_n$ with corresponding multipliers 604 that determine the product of an associated filter coefficient with a corresponding symbol from the transmit stream. In FIG. 6, the first eight filter coefficients $C_{-2}$ through $C_5$ are fixed—always multiplied by a symbol with a corresponding offset from the cursor position.

For each of the remaining coefficients, one of the multiplexers 602-1 through 602-M selects between symbols at different possible offsets from the cursor to be multiplied by the coefficient. For example, coefficient $C_6$ is multiplied by the output of multiplexer 602-1, which is a selected one of $X_{k-6}$, $X_{k-8}$, $X_{k-10}$, . . . $X_{k-20}$. Coefficient C7 multiplies the output of multiplexer 602-2, which is a selected one of $X_{k-7}$, $X_{k-9}$, $X_{k-11}$, . . . $X_{k-21}$. A summer 606 determines the sum of the products from the set of multipliers 604, and a latch 608 holds the sum $Y_k$ as the filter output while the filter output for the subsequent interval is calculated. The exact number of coefficients, range of buffered input symbols, and configuration of the multiplexers can be varied. As previously mentioned, the transmit symbols can be represented with one or two bits, such that the multipliers 604 can be implemented with minimal complexity.

Numerous alternative forms, equivalents, and modifications will become apparent to those skilled in the art once the above disclosure is fully appreciated. For example, the training controller may adapt the pre-equalizer and equalizer coefficients not just during the link training phase, but also during normal use of the communications link. The training controller may further adapt parameters of the CTLE filter 434 and gain control amplifier 432. The order of components shown in FIGS. 4 and 5 can be varied, e.g., by moving filters from digital domain to analog domain. It is intended that the claims be interpreted to embrace all such alternative forms, equivalents, and modifications that are encompassed in the scope of the appended claims.

What is claimed is:

1. A network device that comprises:
    a substrate having a host device IC (integrated circuit) and an optical module IC connected by a short-reach link, the optical module IC having a transmit chain including:
        a CTLE (continuous time linear equalizer) to at least partly compensate for a channel response of the short-reach link; and
        a driver that amplifies an output of the CTLE for a photoemitter that couples to an optical fiber; and the host device IC including:
- a parallel-to-serial converter that produces a digital symbol stream;
- a digital to analog converter that supplies an analog signal to the short-reach link; and
- a pre-equalizer coupling the parallel-to-serial converter to the digital-to-analog converter, the pre-equalizer filtering the digital symbol stream to at least partly compensate for a channel response of a combined channel that includes the short-reach link, the CTLE, the driver, and the photoemitter.

2. The network device of claim 1, wherein the combined channel further includes the optical fiber and a remote photodetector.

3. The network device of claim 1, wherein the combined channel further includes the optical fiber, a remote optical module IC, and a remote short-reach link that connects the remote optical module IC to a remote host device IC.

4. The network device of claim 1, wherein the pre-equalizer is a finite impulse response filter with one or more floating taps.

5. The network device of claim 1, wherein the optical module IC also has a receive chain including:
- a photodetector to convert an optical receive signal into an electrical receive signal; and
- a gain control amplifier that conveys the electrical receive signal via the short-reach link to the host device IC.

6. The network device of claim 5, wherein the host device IC further includes:
- an analog-to-digital converter that converts the electrical receive signal into a digital receive signal;
- an equalizer that operates on the digital receive signal to produce an equalized signal; and
- a data recovery element that converts the equalized signal into a received digital data stream.

7. The network device of claim 6, wherein the host device IC further includes a training controller that modifies coefficients of the pre-equalizer and the equalizer to better compensate for the channel response of the combined channel.

8. The network device of claim 7, wherein the training controller provides a stream of training frames having header information including coefficient updates for a remote pre-equalizer.

9. An equalization method for use in a network device having a host device IC (integrated circuit) on a substrate connected by a short-reach link to an optical module IC on the substrate, the method comprising:
in the optical module IC:
- using a CTLE (continuous time linear equalizer) to at least partly compensate for a channel response of the short-reach link; and
- amplifying an output of the CTLE with a driver for a photoemitter that couples to an optical fiber; and
in the host device IC:
- filtering a digital symbol stream with a pre-equalizer to at least partly compensate for a channel response of a combined channel that includes the short-reach link, the CTLE, the driver, and the photoemitter.

10. The equalization method of claim 9, wherein the combined channel further includes the optical fiber and a remote photodetector.

11. The equalization method of claim 9, wherein the combined channel further includes the optical fiber, a remote optical module IC, and a remote short-reach link that connects the remote optical module IC to a remote host device IC.

12. The equalization method of claim 9, wherein the pre-equalizer is a finite impulse response filter with one or more floating taps.

13. The equalization method of claim 9, further comprising in the optical module IC:
- converting an optical receive signal into an electrical receive signal; and
- amplifying the electrical receive signal with a gain control amplifier for conveyance via the short-reach link to the host device IC.

14. The equalization method of claim 13, further comprising in the host device IC:
- converting the electrical receive signal into a digital receive signal;
- operating on the digital receive signal using an equalizer to produce an equalized signal; and
- converting the equalized signal with a data recovery element into a received digital data stream.

15. The equalization method of claim 14, wherein the host device IC further includes a training controller that modifies coefficients of the pre-equalizer and the equalizer to better compensate for the channel response of the combined channel.

16. The equalization method of claim 15, wherein the training controller provides a stream of training frames having header information including coefficient updates for a remote pre-equalizer.

17. A network device that comprises:
- a substrate having a host device IC (integrated circuit) and an optical module IC connected by a short-reach link, the optical module IC having a transmit chain including:
  - a clock and data recovery circuit to obtain a digital symbol stream via the short-reach link;
  - a pre-equalizer that filters the digital symbol stream to at least partly compensate for a channel response of a combined channel; and
  - a driver that amplifies a filtered signal for a photoemitter that couples to an optical fiber,
  - wherein the combined channel includes the driver, the photoemitter, the optical fiber, and a remote photodetector.

18. The network device of claim 17, wherein the optical module IC also has a receive chain including:
- a local photodetector to convert an optical receive signal into an electrical receive signal;
- an analog to digital converter coupled to the local photodetector to derive a digital receive signal;
- an equalizer that operates on the digital receive signal to produce an equalized signal; and
- a data recovery element that converts the equalized signal into a received digital data stream.

19. The network device of claim 18, further comprising a training controller that modifies coefficients of the pre-equalizer and the equalizer to better compensate for the channel response of the combined channel.

20. The network device of claim 19, wherein the training controller provides a stream of training frames having header information including coefficient updates for a remote pre-equalizer.

21. An equalization method for use in a network device having a substrate with a host device IC (integrated circuit) and an optical module IC connected by a short-reach link, the method comprising, in the optical module IC:
- obtaining a digital symbol stream via the short-reach link using a clock and data recovery circuit;

filtering the digital symbol stream with a pre-equalizer to at least partly compensate for a channel response of a combined channel; and amplifying a filtered signal with a driver for a photoemitter that couples to an optical fiber, wherein the combined channel includes at least the driver, the photoemitter, the optical fiber, and a remote photodetector.

22. The equalization method of claim 21, further comprising, in the optical module IC:

converting an optical receive signal into an electrical receive signal;

deriving a digital receive signal from the electrical receive signal;

operating on the digital receive signal with an equalizer to produce an equalized signal; and using a data recovery element to convert the equalized signal into a received digital data stream.

23. The equalization method of claim 22, further comprising, in the optical module IC; using a training controller to modify coefficients of the pre-equalizer and the equalizer to better compensate for the channel response of the combined channel.

24. The equalization method of claim 23, wherein the training controller provides a stream of training frames having header information including coefficient updates for a remote pre-equalizer.

* * * * *